United States Patent [19]

Aharoni

[11] Patent Number: 5,493,000
[45] Date of Patent: Feb. 20, 1996

[54] FRACTAL POLYMERS AND GRAFT COPOLYMERS FORMED FROM SAME

[75] Inventor: Shaul M. Aharoni, Morris Plains, N.J.

[73] Assignee: AlliedSignal Inc., Morris Township, Morris County, N.J.

[21] Appl. No.: 109,954

[22] Filed: Aug. 23, 1993

Related U.S. Application Data

[63] Continuation-in-part of Ser. No. 840,725, Feb. 21, 1992, abandoned.

[51] Int. Cl.$^6$ .................................... C08G 69/00
[52] U.S. Cl. ............................. 528/350; 528/44; 528/48; 528/74; 528/310; 528/323; 528/331; 528/332; 528/373; 528/376; 528/397; 528/403; 528/405; 528/425; 428/411.1; 428/474.4
[58] Field of Search ................................ 528/350, 44, 48, 528/74, 328, 323, 310, 331, 332, 373, 376, 397, 403, 405, 425; 428/474.4, 411.1

[56] References Cited

U.S. PATENT DOCUMENTS

| | | |
|---|---|---|
| 4,360,646 | 11/1982 | Denkewalter et al. . |
| 4,410,688 | 10/1983 | Denkewalter et al. . |
| 4,507,466 | 3/1985 | Tomalia et al. . |
| 4,558,120 | 12/1985 | Tomalia et al. . |
| 4,568,737 | 2/1986 | Tomalia et al. . |
| 4,587,329 | 5/1986 | Tomalia et al. . |
| 4,694,064 | 9/1987 | Tomalia et al. . |
| 4,737,550 | 4/1988 | Tomalia . |
| 4,857,599 | 8/1989 | Tomalia et al. . |
| 5,041,516 | 8/1991 | Frechet et al. . |

FOREIGN PATENT DOCUMENTS

| | | |
|---|---|---|
| WO A 9208749 | 5/1992 | WIPO . |
| WO93/09162 | 5/1993 | WIPO . |

OTHER PUBLICATIONS

Building Blocks For Dendritic Macromolecules, Aldrichimica Acts, Vo. 25, No. 2, 1992 pp. 31–38.
Control of Surface Functionality in the Synthesis of Dendritic Macromolecules Using the Convergent–Growth Approach, Macromolecules 1990, 23, pp. 4726–4729.
Gelled Networks Prepared from Rigid Fractal Polymers, Shaul M. Aharoni, Macromolecules 1991, 24, pp. 235–239.
Starburst Dendrimers: Molecular–Level Control of Size, Shape, Surface Chemistry, Topology, and Flexibility from Atoms to Marcroscopic Matter, By Donald A. Tomalia et al., pp. 138–175, Angew, Chem Int. Ed Engl. 29 (1990).
Fractal Nature of One–Step Highly Branched Rigid Rodlike Macromolecules and Their Gelled–Network Progenies; S. Aharoni et al., 1990 American Chemical Society pp. 2533–2549, Macromolecules, Vo. 23, No. 9, 1990.
Aharoni, "Gelled Networks Prepared from Rigid Fractal Polymers", vol. 24, No. 1, pp. 235–239 (1991).
Aharoni et al. "Fractal Nature of One–Step Highly Branched Rigid Rodlike Macromolecules and their Gelled–Network Progenies", vol. 23, No. 9, pp. 2533–2549, (1990).
"Synthesis & Properties of Star–Branched Nylon 6", J. M. Warakomski, Chem. Mater. vol. 4, (1992) pp. 1000–1004 The month of publication is not available for these references.
"Lyotropic Liquid Crystalline Hyperbranched Aromatic Polyamides", Y. H. Kim, J. Am. Chem. Soc., vol. 114, (1992) pp. 4947–4948 The month of publication is not available for these references.

*Primary Examiner*—P. Hampton-Hightower
*Attorney, Agent, or Firm*—Michele G. Mangini

[57] ABSTRACT

This invention relates to a branched fractal three dimensional porous polymer species which comprises rigid aromatic recurring units having electrophilic or nucleophilic reactive moieties on the exterior thereof. Another aspect of this invention relates to a star polymer comprising a polymeric core formed of the fractal polymers (FPS) of this invention having linear polymeric moieties grafted to the exterior thereof by way of residues formed by reaction between the reactive moieties on the exterior of the fractal polymer (FP) and complimentary reactive moieties on a linear polymer. Yet another aspect of this invention relates to polymeric composites comprising a polymer matrix having dispersed therein the star polymers of this invention.

27 Claims, No Drawings

FRACTAL POLYMERS AND GRAFT COPOLYMERS FORMED FROM SAME

RELATED APPLICATIONS

This application is a continuation-in-part application of Ser. No. 840,725, filed Feb. 21, 1992, now abandoned.

BACKGROUND OF THE INVENTION

1. Field of the Invention

This invention relates to a branched fractal three dimensional porous polymer species which comprises rigid aromatic recurring units having electrophilic or nucleophilic reactive moieties on the exterior thereof. Another aspect of this invention relates to a star polymer comprising a polymeric core formed of the fractal polymers (FPS) of this invention having linear polymeric moieties grafted to the exterior thereof by way of residues formed by reaction between the reactive moieties on the exterior of the fractal polymer (FP) and complimentary reactive moieties on a linear polymer. Yet another aspect of this invention relates to polymeric composites comprising a polymer matrix having dispersed therein the star polymers of this invention.

2. Description of the Prior Art

Aharoni et al. *Macromolecules*, Vol. 23, No. 9, pg. 2533 (1990) describes the preparation of rigid and flexible polymeric networks and their gels by the reaction of aromatic diamine monomers (BB monomers) with aromatic or aliphatic diacid monomers (AA monomers).

Aharoni, S. M., *Macromolecules*, Vol. 24, No. 1, pg. 235 (1991), discloses that the formation of crosslinked networks takes place between fractal polymers whose surfaces are decorated by A and B reactive groups and may take place in the absence of all monomeric or low molecular weight species, by the direct reaction of the fractal polymers under appropriate reaction conditions. When the fractal polymers are made from AB monomers, then their exteriors are decorated by only one kind of reactive group, either A or B, and may not react with each other to form crosslinked networks. AB monomers are divalent or polyvalent monomeric species containing either one A group and one or more B groups, or, one B group and one or more A groups.

Conceptually similar structures, called starburst or dendimer polymers are described in Tomalia, et al, *Angew, Chem. Intern. Ed. Engl.*, 29, 138 (1990), U.S. Pat. No. 4,289, 872 and Hawker and Frechet, Macromolecules, 23, 4726 (1990). All these are tedious stepwise reactions which require at each growth step the preparation of protected or unreactable groups on the growing substantially aliphatic, branched species.

BRIEF DESCRIPTION OF THE INVENTION

A "porous" fractal polymer comprising a polymeric matrix comprising one or more linear polymers and a three dimensional or substantially three dimensional branched polymeric species dispersed in said matrix and having said linear polymer interpenetrated therein, said species comprising:

one or more aromatic nuclei of the formula:

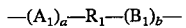

a branched polymeric moiety bonded to and projecting away from said nuclei having a plurality of branching recurring monomeric units of the formula:

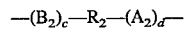

which branching recurring monomeric units may be optionally linked by a plurality of linear or substantially linear aromatic polymer segments having one or more recurring extension monomeric units of the formula:

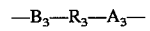

said extension moieties, and a plurality of pendant moieties on the exterior of said polymeric species and bonded thereto, said pendant moieties of the formula:

when d is greater than c and said pendant moieties of the formula:

when c is greater than d, a portion of said branching moieties, said extension moieties of a combination thereof having one or more terminating groups of the formula: $(B_2)_c$—$R_2$—$(Z_1)_d$, —$(A_2)_d$—$R_2$—$(Z_2)_c$, —$B_3$—$R_3$—$Z_1$ or —$A_3R_3$—$Z_2$, or a combination thereof;

wherein:

a and b are different and are integers equal to 0, or equal to or greater than 3, with the proviso that a or b is 0;

$R_1$ is a polyvalent aromatic group such as phenyl, biphenyl, naphthyl or the like or is an aromatic moiety comprising two or more aromatic groups linked together by a linking moiety such as ester, alkylene, urethane or amide linkage;

$R_2$ and $R_3$ are the same or different at each occurrence and are polyvalent aromatic group such as phenyl, naphthyl, biphenyl or the like;

—$Z_2$ is the same or different at each occurrence and is a nucleophilic group such as —OH, —$NH_2$, —$N(R)_3^+$, —C≡N, and —$C(O)N(R)_2$ (where R is the same or different and is hydrogen, alkyl, aryl, or aralkyl) which is capable of reaction, such as displacement reaction or the like, with a —$Z_1$ group to form a covalent bond or a derivative thereof;

—$Z_1$ is the same or different at each occurrence and is electrophilic group such as —C(O)OH, —N=C=O, —C(O)Cl, —(O)OR, and C(O)OM where M is a monovalent cation such as $NH_4^\oplus Na^\oplus$, $K^\oplus$, $Li^\oplus$, $Cu^\oplus$, $Ni^\oplus$ and the like and R is as described above, which is capable of reaction such as a displacement reaction or the like, with a —$Z_2$ group to form a covalent bond or a derivative thereof;

$A_1$, $A_2$ and $A_3$ are the same or different at each occurrence the residue of a nucleophilic group such as —N(H)—, —O— and the like formed by a reaction between a nucleophilic group $Z_2$ and an electrophilic group $Z_1$;

$B_1$, $B_2$ and $B_3$ are the same or different at each occurrence and is the residue of an electrophilic group such as —C(O)—, —N(H) C(O)— and the like formed by reaction between a nucleophilic group —$Z_2$ and an electrophilic group —$Z_1$; and c and d are different and are integers equal to or greater than 1, with the proviso that the sum of c and d is equal to or greater than 3, and with the further proviso that when a is equal to 0 then d is greater than c and that when b is equal to 0 then c is greater than d.

Another embodiment of this invention relates to a star copolymer comprising:

a porous fractal polymer core comprising a three dimensional or substantially three dimensional branched polymeric species comprising:

one or more aromatic nuclei of the formula:

$$-(A_1)_a-R_1-(B_1)_b-$$

a branched polymeric moiety bonded to and projecting away from said nuclei having a plurality of branching recurring monomeric units of the formula:

$$-(B_2)_c-R_2-(A_2)_d-$$

which branching recurring monomeric units may be optionally linked by a plurality of linear or substantially linear aromatic polymer segments having one or more recurring extension monomeric units of the formula:

$$-B_3-R_3-A_3-$$

said extension moieties, a portion of said branching moieties, said extension moieties of a combination thereof having one or more terminating groups of the formula: $(B_2)_c-R_2-(Z_1)_d$, $-(A_2)_d-R_2-(Z_2)_c$, $-B_3-R_3-Z_1$ or $-A_3R_3-Z_2$, or a combination thereof; and one or more graft linear or substantially linear polymeric moieties, which may be the same or different, covalently bonded to the exterior of said core by way of divalent exterior linking moieties of the formula:

$$-Z_1-$$

when c is greater than d, and of the formula:

$$-Z_2-$$

when d is greater than c, wherein a, b, c, d, $R_1$, $R_2$, $-A_1-$, $-A_2-$, $-A_3-$, $-B_1-$, $-B_2-$, $-B_3-$, and $R_3$ are as described above, and $-Z_1-$ is the residue formed by reaction of an exterior $-Z_1$ group of said core and a $-Z_2$ group substituted to a linear or substantially linear polymer precursor of said linear or substantially linear polymeric moieties, and $-Z_2-$ is the residue formed by reaction of an exterior $-Z_2$ group of said core and a $-Z_1$ moiety substituted to a linear polymer.

Yet another embodiment of this invention relates to a copolymeric network comprising:

a porous fractal polymer core comprising a three dimensional or substantially three dimensional branched polymeric species comprising:

one or more aromatic nuclei of the formula:

$$-(A_1)_a-R_1-(B_1)_b-$$

a branched polymeric moiety bonded to and projecting away from said nuclei having a plurality of branching recurring monomeric units of the formula:

$$-(B_2)_c-R_2-(A_2)_d-$$

which branching recurring monomeric units may be optionally linked by a plurality of linear or substantially linear aromatic polymer segments having one or more recurring extension monomeric units of the formula:

$$-B_3-R_3-A_3-$$

said extension moieties, a portion of said branching moieties, said extension moieties of a combination thereof having one or more terminating groups of the formula: $(B_2)_c-R_2-(Z_1)_d$, $-(A_2)_d-R_2-(Z_2)_c$, $-B_3-R_3-Z_1$ or $-A_3R_3-Z_2$, or a combination thereof; two or more of said fractal polymer cores covalently bonded together by a divalent linking moiety of the formula:

$$-B_4-R_4-A_4-$$

covalently bonded to the exterior of said fractal polymer cores by way of divalent linking moieties of the formula:

$$-A-$$

when c is greater than d, and of the formula:

$$-B-$$

when d is greater than c, wherein a, b, c, d, $-A_1-$, $-A_2-$, $-A_3-$, $-B_1-$, $-B_2-$, $-B_3-$, $R_1$, $R_2$, and $R_3$ are as described above, $-A-$ and $-B-$ are as described above and are nucleophilic or electrophilic residues formed by reaction of an exterior $-Z_1$ group and a $-Z_2$ moiety substituted to a linear polymer or is a nucleophilic or electrophilic residue formed by reaction of an exterior $-Z_2$ group and a $-Z_1$ group substituted to a linear polymer; and $R_4$ is linear polymer as for example a polyester, polyamide, polyurethane, polyalkylene, polyether and the like.

Yet another aspect of this invention relates to a molecular composite comprising a matrix which comprises one or more matrix polymers selected from the group consisting of crystalline polymers, amorphous polymers and combinations thereof having dispersed therein a star copolymer of this invention. The molecular composite of this invention exhibits one or more advantages as compared to compositions formed from the matrix polymer alone. Such advantages include increased Youngs modulus, tensile stress and/or yield stress. Molecular composites of this invention containing substantial amounts of copolymer of this invention exhibit higher heat deflection temperatures, and lower solution and melt viscosities than their linear analogues.

DESCRIPTION OF THE PREFERRED EMBODIMENTS OF THE INVENTION

The fractal polymer of this invention must exhibit one essential property: the fractal polymers used in this invention are "porous". As used herein, "porous" means that the fractal polymer is an open structure requiring that the ratio of the volume material in the fractal polymer to the volume of gyration of the fractal polymer is equal to or more than about 0.50, preferably equal to or less than 0.01, more preferably from about 0.40 to about 0.02 and most preferably from about 0.30 to about 0.04. The volume of the fractal polymer may be calculated from relevant atomic volumes and bond lengths reported in the literature. See for example, B. Wunderlich "Macromolecular Physics" Vol. 1 (Academic Press, NY 1973) pp. 39–68. A. J. Hopfinger "Conformational Properties of Macromolecules" (Academic Press, NY 1973) pp. 2–24. The volume of gyration can be determined by conventional procedures such as small angle X-ray scattering and light scattering measurements performed on solutions of the fractal polymers in an appropriate solvent as described in greater detail in J. P. Sibilia (Editor) "A Guide to Materials characterization and Chemical Analysis" (VHC, NY 1988). The volume of gyration may also be calculated by computers using appropriate computer programs, atomic sizes, bond lengths and angles. The porosity of the fractal polymer depends on the average distance between branchpoints in the arms of the fractal polymers. For example, using 3,5-diaminobenzoic acid as the only monomer in the fractal polymer the distance between branchpoints is a moiety of the formula:

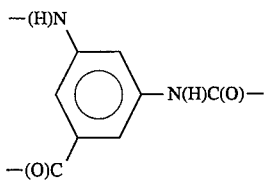

Various fractal polymers based solely on 3,5-diaminobenzoic acid having varying fractal polymer volumes, volumes of gyration and ratios of fractal polymer volume to volume of gyration as shown in the following Table I.

TABLE I

| Molecular Weight | Material Fractal Polymer (Å)³ | Volume of Gyration (Å)³ | Ratio |
| --- | --- | --- | --- |
| 7230 | 6890 | 40619 | 0.17 |
| 13980 | 12399 | 65951 | 0.20 |
| 20730 | 19697 | 88384 | 0.22 |
| 27480 | 26069 | 110655 | 0.24 |

By the using 1:1 aminobenzoic acid to form (linking units —B—R$_3$— A— and 3,5-diaminobenzoic acid to form branching moieties —(B)$_c$R$_2$— (A)$_d$—. The distance between branchpoints is defined by a species of the formula:

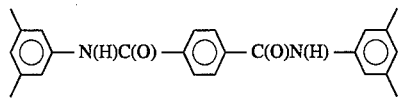

which is essentially doubles the distance resulting in a structure which more open as shown in Table 2: (See ratio value)

TABLE II

| Molecular Weight | Fractal Polymer Volume, (Å)³ | Volume of Gyration, (Å)³ | Ratio |
| --- | --- | --- | --- |
| 6846 | 6618 | 104424 | 0.06 |
| 13212 | 12620 | 172325 | 0.07 |
| 19578 | 18734 | 204205 | 0.09 |
| 25944 | 24857 | 217039 | 0.11 |
| 32214 | 30806 | 249588 | 0.12 |

When the average distance between branchpoints was further increased, by the use of 4:1 p-aminobenzoic acid (forming extension moieties —B—R$_3$—A) and 3,5-diaminobenzoic acid (forming branching moieties —(B)$_c$—R$_2$—(A)$_d$—, the ratio of fractal polymer volume to volume of gyration decreased dramatically as shown in the following Table 3:

TABLE 3

| Molecular Weight | Material Volume (Å)³ | Volume of Gyration (Å)³ | Ratio |
| --- | --- | --- | --- |
| 6590 | 6314 | 294214 | 0.02 |
| 12732 | 12206 | 626322 | 0.02 |
| 18778 | 17975 | 799052 | 0.02 |
| 24904 | 23835 | 1015028 | 0.02 |
| 31046 | 29721 | 1312612 | 0.02 |

The fractal polymers of Tables 1, 2 and 3 are highly porous, capable of accommodating a relatively large volume fraction of interpenetrated linear polymer guests, while the dendrimers are very compact, dense, and incapable of accommodating linear polymeric guests. This is the fundamental difference between the porous fractal polymers and compact dendrimers.

A dendrimer was constructed from the same monomers in table I above as described in U.S. Pat. Nos. 4,360,646; 4,507,466; 4,558,120; 4,568,737; 4,587,329; 4,694,064; 4,737,550; 4,857,599 and 5,041,516 by not allowing monomers to react with each other but only with the previous generation of the growing polymeric species. The dendrimer contained 5 generations. The molecular weight, polymer volume of the dendrimer, volume of gyration of the dendrimer and ratio of the polymer volume and volume of gyration were determined and are set forth in the following Table 4.

TABLE 4

| Molecular Weight | Dendrimer Polymer Volume, (Å)³ | Volume of Gyration, (Å)³ | Ratio |
| --- | --- | --- | --- |
| 27970 | 24722 | 32787 | 0.75 |

A comparison of the data in Tables 1, 2 and 3 with the data in Table 4 clearly shows that the porosity is greater than that of the dendrimer. The volume ratio of the dendrimer is 0.75, which is significantly greater than that of the fractal polymers and is closer to ratio of 1.00 for a fully solid sphere. Because of the large volume ratio, no or substantially no long linear polymer chains penetrate within the dendrimer.

In the fractal polymers the volume ratios are rather small, indicating high porosity and an ability to accommodate in the FP a substantial volume fraction of solvent and/or linear polymer chains, provided they are chemically compatible.

As an essential component, the fractal polymer of this invention include one or more aromatic nuclei of the formula:

$$-(A_1)_a-R_1-(B_1)_b-$$

where $A_1$, $R_1$, b, $B_1$ and a are as defined above. The number of aromatic nuclei include in the fractal polymer may vary widely. The number of nuclei is preferably from 1 to about 8, more preferably from 1 to about 4, and most preferably 1 or 2. Those embodiments in which the number of nuclei is 1 are the embodiments of choice.

The nuclei comprises a polyvalent (valency equal to or greater than three) aromatic moiety —$R_1$—. Useful polyvalent —$R_1$— aromatic groups may vary widely and are not critical. Illustrative of useful $R_1$— groups are phenylene, biphenylene, naphthyl, dinaphthyl, diphenyl ether, diphenyl sulfone, phenyl benzoate, 2,2-biphenylene propane, benzanilide and combinations thereof obtained by linking any number of aromatic groups by means of direct ring-ring condensation, inter-ring single covalent bond on such groups as amide, ester, ether, azo, methylene, sulfide, carbonate, sulfone, urethane and the like. Other, small, fractal polymers may also serve as $R_1$— groups for larger fractal polymers. In the most preferred embodiments of this invention, $R_1$— groups are the same or different and are phenylene or naphthylene, or an aromatic moiety formed by two or more phenylene groups connected by amide, ester or urethane linking groups (preferably amide or ester linking groups and more preferably amide linking groups).

The aromatic nucleus also comprises linking moieties of the formula $A_1$ and $B_1$ which are defined above. Preferred —$A_1$— groups are —O— and —N(H)— and preferred —$B_1$— groups are —C(O)O— and —N(H)C(O)— .

As a second essential component, the fractal polymer comprises a plurality of branching monomeric units of the formula:

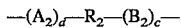

in which A, B, —$R_2$—, c and d are as described above.

—$R_2$ groups may vary widely and are polyvalent aromatic groups. Illustrative of useful —$R_2$— of the formula:

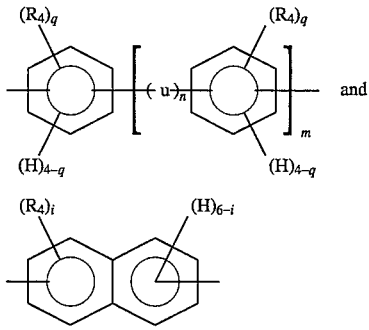

wherein:
q is an integer from 0 to 4;
i is an integer from 0 to 6;
m is 0 or an integer equal to or greater than 1;
n is 0 or 1;
U is the same or different at each occurrence and is —O—, —S—, —$SO_2$—, —$N(R_5)$—, —$N(R_5)C(O)N(R_5)$, —N=N—, —$N(R_5)$, —$N(R_5)C(O)$—, —$C(O)N(R_5)$—, —S(O)—, —C(O), —C(O)O—, —OC(O)— or —$[C(R_5)(R_6)]_p$—;
$R_4$ is the same or different at each occurrence and is alkyl, aryl, alkoxyaryl, alkylaryl, arylalkyl, alkoxy, alkoxyalkyl, nitro, cycloalkenyl, halo, cyano, cycloalkyl or aryloxy; and
$R_5$ and $R_6$ are the same or different and are hydrogen, alkyl or aryl.

Preferred —$R_2$ groups are those of the above formula wherein:
$R_4$ is the same or different at each occurrence and is alkyl, alkoxy, aryl, phenoxy or halo (more preferably alkyl); and
q, h and i are the same or different and are 0 or 1;
n is 0 or 1;
m is 0 or 1;
p is 1 or 2;
U is —O—, —$S(O_2)$—, —N(H)C(O)N(H)—, [—$C(R_5R_6)$—]$_p$, —C(O)—, —$N(R_5)$—, —C(O)O— or —N(H)C(O)— (more preferably —N(H)— and —$C(R_5R_6)$—; and
$R_5$ and $R_6$ are the same or different at each occurrence and is hydrogen or alkyl of from 1 to 4 carbon atoms (more preferably $R_5$ is hydrogen and $R_6$ is hydrogen or methyl.

—$A_2$— and —$B_2$ groups are linking groups as described above. Preferred embodiments of the invention are those where the —$B_2$— group is —C(O) or —N(H)C(O)— and the —$A_2$— group is —O— or —N(H)—

The fractal polymer of this invention may also include one or more interior polymeric segments having one or more extension monomeric groups of the formula:

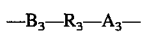

as an optional component, where —$A_2$—, —$B_3$—, and $R_3$ are as described above. Useful—$A_3$—, —$B_3$—, and $R_3$ groups and the order of preference are as described above for the branching monomeric units of the formula:

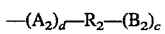

The mole % of branching monomer units and extension monomeric units and their relative proportions may vary widely depending on the desired properties. For example, the greater the amount of extension monomeric units, the greater the distance between branching points and the more expanded the fractal polymer particle and the greater the porosity of the fractal polymer. Conversely, the lesser the amount of extension units, the less the distance between branching points and the more compact and less porous the fractal polymer. In general, the mole % of branching monomeric units is from about 100 to about zero and the mole % of extension monomeric units is from 0 to about 95 based on the total moles of branching monomeric units and extension monomeric units. Preferably, the mole % of branching monomeric units is from about 100 to about 33 and the mole % of extension monomeric units is from about 10 to about 75; more preferably mole % of branching monomeric units is from about 75 to about 40 and of extension monomeric units is from about 25 to about 70; and most preferred mole % of branching monomeric units is from about 70 to about 45 and the mole % of extension monomeric units is from about 30 to about 65.

The fractal polymers of this invention will also include various terminating groups in the interior of fractal polymer which may be bonded to the —$B_2$ and/or —$A_2$ moieties of the branching monomeric units and for the —$B_3$ and/or —$A_3$— moieties of the extension monomeric units. These interior-terminating groups result from incomplete reaction of monomers during the preparation of the fractal mainly because of steric hindrance. For example, in the reaction of monomers of the formula $(Z_2)_d$—$R_2$—$(Z_1)_c$ to form branching monomers of the formula:

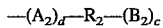

incomplete reaction may occur between branching monomers, extension monomers or a combination thereof because of an inability of reactive moieties to react resulting in terminating groups of the formula —(A)$_d$—$R_2(Z_1)_c$, —(B)$_c$—$R_2(Z_2)_d$ or a combination thereof to a branching moiety and/or extension moiety. Moreover, the same phenomenon can occur with monomers forming extension moieties which partially react with themselves and with branching monomers to form terminating groups of the formula —A—$R_3$—$Z_1$, —B—$R_3$—$Z_2$ or a combination thereof. The fact that all of the reactive end groups of the monomers do not react forming interior terminating groups is in part responsible for the enhanced porosity of the fractal polymers as compared to the porosity of dendrimers where all or substantially all reactive moieties of the monomers are reacted and the dendrimer does not include interior terminating groups. In general, the amount of interior terminating groups is at least about 5 mole % based on the total moles of branching monomeric units and extension monomeric units. The amount of the interior terminating group is preferably at least about 6 mole %, more preferably from about 8 to about 30 mole % and most preferably from about 10 to about 35 mole % on the aforementioned basis.

The values of a, b, c and d may vary widely within the stated ranges. The greater the value of a, b, c and d, the heavier the degree of branching and the more rigid the fractal polymer; and conversely, the lower the value of a, b, c or d the less heavily the degree of branching and the less rigid the polymer. In the preferred embodiments of the invention, a and b are different and are 0, or integers from 3 to about 20, with the proviso that one of a or b is 0, and c and d are different and are integers from 1 to about 5 with the proviso that the sum of c and d is from 3 to about 9. In the more preferred embodiments of the invention, a and b are different and are 0 or integers from 3 to about 12, with the proviso that one of a or b is 0, and c and d are different and are integers from 1 to about 5 with the proviso that the sum of c and d is from 3 to about 7. In the most preferred embodiments of the invention, a and b are different and are 0 or integers from 3 to 6 with the proviso that one of a or b is 0, and c and d are the same or different and are integers from 1 to about 4, with the proviso that the sum of c and d is from 3 to about 5.

The fractal polymer of this invention includes at least one electrophilic surface moiety $—Z_1$ or at least one nucleophilic surface moiety of $—Z_2$. Useful $—Z_1$ moieties may very widely and include electrophilic groups such as $—C(O)OH$, $—N{=}C{=}O$, $—C(O)Cl$ and the like or such groups which have been derivatized by reaction with a derivatizing reagent as for example $R_7OH$ and $R_7NH_2$ where $R_7$ is aryl or alkyl to form functionalities such as $R_7N(H)C(O)—$, $R_7N(H)C(O)O—$, or $R_7OC(O)$. Preferred $—Z_1$ groups are $—C(O)OH$, and $—N{=}C{=}O$, and more the preferred $—Z_1$ group is $—C(O)OH$ or derivatized forms thereof such as $R_7B(H)C(O)—$ and $R_7OC(O)—$ where $R_7$ is as defined above. Useful $—Z_2$ moieties may vary widely and include nucleophilic moieties such as $—NH_2$, $—OH$, and the like. Preferred $—Z_2$ groups are $—NH_2$, and $—OH$, and the more preferred $—Z_2$ group is $—NH_2$ or derivatized forms thereof such as $R_7C(O)N(H)—$ and $R_7OC(O)N(H)—$ where $R_7$ is as defined above.

The relative values of a, b, c, and d is determinative of whether a $—Z_1$ or $—Z_2$ group is on the exterior of the fractal polymer and also controls the degree of branching. The average number of functionalities substituted on the exterior of the fractal polymers is dictated by the ratio of trivalent or higher valent monomers to nuclei in the reaction mixture.

The number and type of exterior moieties $—Z_1$ or $—Z_2$ included in the fractal polymer of this invention may vary widely, and depends on the relative values of a, b, c and d and the reactive branching and extension monomers used to form the fractal polymer of this invention. The number of surface reactive groups $—Z_1$ or $—Z_2$ is usually at least about 6. The number of $—Z_1$ or $—Z_2$ groups are preferably from about 6 to about 256, more preferably from about 8 to about 200 and most preferably from about 12 to about 128.

Fractal polymer average particle radius may very widely. In general, the average particle radius is equal to or less than about 50 nanometer (nm). Preferred average particle radius is from about 20 nm to about 1 nm, more preferred average particle radius is from about 10 nm to about 1.5 nm, and most preferred average particle radius is from about 7.5 nm to about 1.5 nm.

The number average molecular weight of the fractal polymer may vary widely. The number average molecular weight is usually at least about 5,000, preferably at least about 10,000, more preferably from about 10,000 to about 300,000, and most preferably from about 20,000 to about 100,000.

The fractal polymer of this invention can be prepared by any suitable method. In the preferred embodiments of this invention, the fractal polymer is formed by reacting one or more nuclei precursor monomers of the formula:

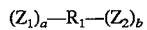

and one or more branching precursor monomer of the formula:

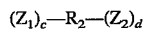

wherein $—Z_1$, $—Z_2$, $R_1$, $R_2$, a, b, c and d are as described above, in an aprotic solvent in the presence of an effective amount of one or more phosphite compounds and an effective amount of a base.

Useful nuclei precursor monomers and branching precursor monomers may vary widely and include those which will provide the desired nuclei and branching monomeric units described above in the same preference. In the preferred embodiments of the invention, useful nuclei precursor monomers and branching precursor monomers are those in which $—Z_1$ is $—OH$ or $—NH_2$ and $—Z_2$ is $—C(O)OH$ or $—N{=}C{=}O$, and more preferred precursor nuclei monomers and branching precursor monomers are those in which $—Z_1$ is $—OH$ or $—NH_2$ (especially $—NH_2$), and $—Z_2$ is $—C(O)OH$.

The relative amounts of nuclei monomers and branching monomers used may vary widely depending on a number of factors such as the desired number of reactive $—Z_1$, and $—Z_2$ groups at the exterior of the fractal polymers, the desired size of the fractal polymer and the like. The amount of nuclei precursor monomers employed will usually depend on the total amount of branching precursor monomer and will vary from about 0.005 to about 10 mole % based on the total moles of reactive branching precursor monomer employed. The preferred amount of nuclei precursor monomer is preferably from about 0.01 mole % to about 5 mole %, more preferably from about 0.05 mole % to about 3 mole % and most preferably from about 0.1 mole % to about 2 mole % in the aforementioned basis.

The manner in which the various reactive monomers are contacted is such that the branching precursor monomer preferentially reacts with the nuclei precursor monomer at the beginning of the reaction and with the growing fractal polymer and any remaining nuclei precursor monomer during the course of the reaction. Any procedure capable of accomplishing the foregoing may be employed. It is preferred to add the active branching precursor monomer in solution form having a concentration preferably of (from about 15% to about 1% and more preferably from about 10% to about 2% by wgt of the solution) to a solution of the nuclei precursor monomer (having a concentration preferably of from about 8% to about 2.5% and more preferably from about 6% to about 3% by wgt of the solution) dropwise together with the dropwise addition of a solution of a suitable phosphite compound. The addition should be at a rate sufficient to provide a reaction mixture in which the concentration of branching precursor monomer as a function of time is less than that of nuclei precursor monomer and growing fractal polymer.

The process is carried out in an aprotic solvent having a boiling point equal to or greater than about 115° C. Useful aprotic solvents may vary widely, the only requirements are that they are solvents for the reactants, that they are inert under the reaction conditions and that they have the required boiling point. Illustrative of such solvents are amides such as tetramethylurea, dimethyl formamide, dimethyl thioformamide, N,N-dimethyl acetamide, N-methyl-2-pyrrolidinone, and the like. Preferred aprotic solvents are N,N-dimethylacetamide and N-methyl-2-pyrrolidinone.

Reaction temperatures may vary widely, depending on the boiling point of the reactants and reagents. Usually, the process is carried out at a temperature equal to or less than the boiling point of the solvent. The reaction is preferably carried out at a temperature equal to or less than about 200° C. In the more preferred embodiments of the invention process, temperatures are from about 85° C. to about 150° C., and most preferred process temperatures are from about 100° C. to about 135° C.

The process is carried out in the presence of one or more aromatic phosphite ester compounds. Useful phosphite esters compounds include aromatic or aliphatic phosphite esters, and phosphite esters containing more than one phosphite ester moiety linked by a divalent moiety, as for example an oxygen atom or an aliphatic or aromatic moiety.

Illustrative of useful phosphite esters are compounds of the formula:

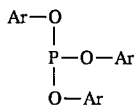

where Ar is aromatic, as for example triphenyl phosphite, diphenyl phosphite, tri(nonylphenyl)phosphite, diphenyl isodecyl phosphite, phenyl diisodecyl phosphite, diphenyl isooctyl phosphite, phenyl diisodecyl phosphite, poly(dipropylene glycol) phenyl phosphite, poly(4,4-isopropylidene glycol) phenyl phosphite, poly(4,4-isopropylidene diphenol neopentyl alcohol phosphite), bis-(2,4 -di-t-butylphenyl)-pentaerythritol diphosphite, and tris-(2,4-di-t-butylphenyl)phosphite.

An effective amount of one or more phosphite ester compounds is employed. As used herein, "an effective amount" is an amount of the phosphite ester compounds which when added in accordance with this invention forms a mixture which when heated forms the desired fractal polymers. In the preferred embodiments of this invention, the quantity of the one or more phosphite ester compound employed is at least equimolar to the amount of A and B groups to be formed in the polycondensation. In the particularly preferred embodiments of this invention, the weight percent of phosphite ester compound is in the range of from 0.1 to about 10 weight percent based on the total weight of the mixture. Amongst these particularly preferred embodiments, those in which the quantity of phosphite ester compound employed is from about 0.2 to about 2 weight percent based on the total weight of the mixture are most preferred.

The reaction is carried out in the presence of an organic base. Useful organic bases may vary widely. Preferred bases are nitrogen bases such as pyridine, imidazole, and various alkylamines such as propylamine, triethylamine and the like, and the most preferred base is pyridine. When the reaction is carried at temperatures higher than the boiling temperatures of the organic bases, these may be kept in solution by continuous reflux.

The base is employed in an amount which is sufficient to promote the reaction to any extent. In general, the amount of base employed is at least equimolar to the amount of branching monomer reactant. In the preferred embodiments of the invention, the amount of base is at least about 2 equivalents of base, based on the total moles of the branching monomer reactant. In the more preferred embodiments of the invention, the amount of base is from about 2 equivalents of base to about 4 equivalents of based on the total moles of the reactant.

As an optional reactant, the reaction mixture may include an extension monomer reactant to control the distance between branchpoints formed from reaction of the branch point monomer reactants and therefore the size of the fractal polymer. Useful extension monomer reactants are of the formula:

$$Z_1—R_3—Z_2$$

wherein $Z_1$, $Z_2$ and $R_3$ are as described above. Illustrative of suitable extension monomers are those in which $R_3$, $—Z_1$ and $Z_2$ are described above relative to suitable branching precursor monomers and nuclei precursor monomers, with the same preferences. For example, extension monomers in which $R_3$ is phenylene, naphthalene and biphenylene; $—Z_1$ is—C(O)OH or—N=C=O, and $Z_2$ is —NH$_2$. More preferred extension monomeric are those in which $R_3$ is phenylene, $—Z_1$ is —C(O)OH and $—Z_2$ is —NH$_2$.

The amount of extension monomer may vary widely and depends on the desired size and flexibility of the fractal polymer. In general, the greater the amount of extension monomer added to the reaction mixture, the larger the size and greater the flexibility of the fractal polymer. Conversely, the lower the amount of extension monomer added to the reaction mixture, the smaller the size of the fractal polymer and the lower the flexibility of the fractal polymer. The amount of extension monomer actually needed in any situation will be selected to provide fractal polymer of the desired size and flexibility.

The extension monomer is preferably added to the reaction mixture in the same manner as the branching precursor monomer, preferably at the same time or substantially at the same time. Here again, the addition is in such a manner that the extension monomer may react with itself to form polymer segments, with the nucleus and with the growing fractal polymer so as to provide segments between the nucleus and branching monomeric units and/or between branching monomeric units.

Reaction pressures are not critical and can be varied widely. For example, the process can be conveniently conducted at sub-atmospheric, atmospheric and super atmospheric pressure. For convenience, atmospheric or autogenous pressures are employed.

The processes are carried out over a period of time sufficient to produce the desired compound in adequate yield. Reaction times are influenced to a significant degree by the reactants; the reaction temperature; the concentration and choice of reactants and catalyst; the choice and concentration of reaction solvent; and by other factors known to those skilled in the art. In general, residence times can vary from about a few minutes to 24 hours or longer. In most instances, when employing preferred reaction conditions, residence times will be found to vary from a few minutes to about 3 hours.

The fractal polymeric product can be isolated from the reaction mixture and purified employing conventional techniques. Illustrative of such techniques are evaporation, precipitation, solvent extraction and recrystallization. The preferred isolation technique is precipitation of the fractal polymer in a non-solvent such as water, alcohol, acetone, etc.

The fractal polymers of this invention have a number of uses. For example, the fractal polymers of this invention are useful in the preparation of polymer blends comprising a polymeric matrix comprising one or more polymers and the fractal polymer of the invention which is "non-reactive" and "compatible" with said polymers, Such blends are described in more detail in copending U.S. application entitled "Interpenetration Blends of Linear Polymers and Compatible Fractal Polymers", U.S. patent application Ser. No. 08/110, 745, filed concurrently herewith. As used herein, "non-reactive" means that exterior $—Z_1$ and $—Z_2$ moieties of the fractal polymer are not reactive with the end groups of the linear polymer in the polymeric matrix under preparation conditions. Thus, grafting of the linear polymer onto the fractal polymer via coupling reactions between the exterior moieties ($—Z_1$ or $—Z_2$) and the end groups of the linear matrix polymer does not occur. As used herein "compatible" refers to the extent to which the amorphous fractions of the linear polymer and the fractal polymer have a favorable interaction which promotes the intermingling of the linear polymer and fractal polymer in the interphase region. Compatibility derives from one or more of the following criteria: similar cohesive energy densities for the linear polymer and the similar or complimentary capacities for dispersive, polar, or hydrogen bonding interactions, or other specific interactions, such as acid/base or Lewis-acid/Lewis-base interactions. The compatibility of the fractal polymer and the amorphous fractions of the linear polymer can be determined by dividing the Hildebrand Parameter of the fractal polymer and the amorphous fractions of the linear polymer into separate contributions from dispersion ($\delta_d$), from polar interactions ($\delta_p$), and from hydrogen bonding interactions ($\delta_h$). In this scheme (which is disclosed in "Handbook of Solubility Parameters and Other Cohesive Parameters", by Allan F. M. Barton (CRC Press, 1983) pp. 141–162, 94–110) the Hildebrand Parameter is related to the contribution from dispersion ($\delta_d$), polar interactions ($\delta_p$) and hydrogen bonding ($\delta_n$) ("Hansen Parameters") by the relationship.

$$\delta^2 = \delta^2_d + \delta^2_p + \delta^2_h$$

In general, the solubility parameter of the amorphous fractions of the linear polymer should be within 1.0 (MPa)$^{1/2}$ of the solubility parameter of the fractal polymer. The difference in solubility parameters is preferably 0.7 (MPa)$^{1/2}$ and more preferably 0.5 (MPa)$^{1/2}$. For example, branched fractal aromatic polyamides and nylon-6 are compatible. The solubility parameter of nylon-6 is 22.5 (PMa)$^{1/2}$ (D. W. Van Krevelen, "Properties of Polymers"; Elsevier, Amsterdam, 1990; p. 800). The solubility parameter of highly branched aromatic polyamides such as those in the fractal polymers of this invention is 23 (MPa)$^{1/2}$. (S. M. Aharoni, J. Appl. Polymer Sci. 45, 813 (1992). The difference in solubility parameters of only 0.5 (MPa)$^{1/2}$, makes the branched aromatic polyamide fractal polymers and the linear nylon-6 substantially compatible and miscible. A good compatibility and molecular-level mixing of the two polymers will be reflected in the appearance of a Tg at temperature higher than the Tg of the linear matrix polymer and in the complete or partial disappearance of the original Tg of the linear matrix polymer as determined by the differential scanning calorimetry heating the blend from a temperature of 25° C. to about 300° C. under inert gas at a heating rate of 20° C. per minute.

The fractal polymers of this invention can be reacted with linear polymers to form star copolymers. These star copolymers have relatively high molecular weight and are characterized by lower melt and solution viscosity than their linear analogues of the same or substantially the same molecular weight, making the star copolymers more processible than such linear analogues. The fractal polymers can be used for ion exchange purposes or as substrates for enzymatic or biomedical processes. The fractal polymers can be reacted with flexible or stiff divalent or polyvalent linear polymer chains or monomers to form three dimensional polymeric networks. These networks are useful for the purposes of ionic exchange, substrates form biomedical and enzymatic analyses and for purification and filtration. The networks may be especially useful as selective adsorbents (due to their swelling) for specific solvents.

The fractal polymers of this invention are especially useful in the formation of star copolymers of this invention and the polymeric networks of this invention. The star copolymer of this invention comprises a fractal polymer having one or more linear graft polymeric moieties grafted to the exterior thereof by way of a linking group such as ester, amide or urethane moiety formed by way of reaction of the polymer precursor of the graft polymeric moieties with the exterior $-Z_1$ or $-Z_2$ moieties of the fractal polymer. The polymeric networks of this invention comprise a plurality of fractal polymers covalently linked by a divalent linking moiety, grafted to two or more fractal polymers by way of a suitable linking group formed as described above.

Graft polymeric moieties may vary widely and essentially include any polymer which can be grafted onto the surface of the fractal polymer. Illustrative of useful graft polymeric moieties are aliphatic polyamides such as poly(butyrolactam) (nylon-4), polycaprolactam (nylon 6), poly(undecanoamide) (nylon 11), and poly(dodecanamide) (polylaurolactam) (nylon 12) and copolymers thereof. Another group of graft polymeric moieties for use in the practice of this invention are amorphous polyamides which are essentially aromatic and are made exclusively from AB monomers containing arylene groups such as phenylene, naphthalene, biphenylene and the like substituted with an amine directly on the aromatic ring and a carboxylic acid attached to the aromatic residue directly or through an alkylene bridging. A typical amorphous polyamide of the formula:

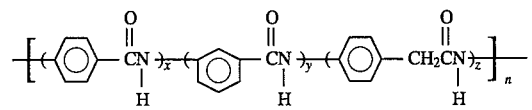

in which the placement of the three residues is random and the molar ratio of the residues x, y and z is such that x<<y+z with x≦0.4 and z≦0.4.

Still other useful graft polymeric moieties include polyolefins such as poly(ethylene), poly(propylene), poly(4-methyl-1-pentene), poly(styrene) and the like; polyvinyls such as poly(vinyl alcohol) and the like; polyacrylics such as poly(acrylonitrile), poly(acrylamide), poly(methyl methacrylate), and the like; poly(oxides) such as poly(ethylene oxide), poly (2,5-dimethyl-1,4-phenylene oxide), poly[-tetramethylene oxide] and the like; polyesters such as poly(ethylene terephthalate), poly(butylene terephthalate), poly(1,4-cyclohexylidene dimethylene terephthalate) and the like; polyamines; polycarbonates; polyurethanes; poly(anilines); polyetherpolyols; and polyester polyols. The nature of the reactable group on the graft polymer and linking polymer precursor is dictated by the reactive groups Z on the fractal polymer exterior, and may by amine, carboxylic acid, isocyanate, hydroxyl group, etc.

Preferred graft polymeric moieties are polyamides and polyesters. More preferred polyamides are poly(butyrolactam) (nylon-4), poly(caprolactam) (nylon 6), poly(undecanoamide) (nylon 11), and poly(dodecanamide) (polylaurolactam) (nylon 12) and copolymers thereof and more preferred polyesters are poly(ethylene terephthalate), poly(butylene terephthalate), poly(1,4-cyclohexylidene dimethylene terephthalate), poly(ethylene-2,6-naphthalene dicarboxylate) or poly(ethylene 1,5 naphthalene dicarboxylate). The most preferred polyamide is poly(caprolactam)(nylon 6), and the most preferred polyesters are poly(ethylene terephthalate) and poly(ethylene-2,6-naphthalene decarboxylate).

Linking moieties may vary widely and include polymeric, oligomeric or monomeric divalent moieties. Illustrative of useful linking moieties linking two or more cores of the polymer network are divalent forms of the graft polymeric moieties described above. Linking moieties also include aliphatic groups such as alkenylene, alkynylene and alkylene groups having at least about 2 carbon atoms, preferably at least about 5 carbon atoms, arylene groups or a combination of arylene and aliphatic groups which may include one or more heteroatoms and functional groups such as —O—, —N(H)—, —C(O)— and the like.

The length of the graft polymeric moieties and the linking moieties may vary widely, and will depend on the desired uses of the star polymer or polymeric network. For example, in situations were relatively flexible materials are required longer and relatively flexible graft polymeric moieties and linking moieties are employed. Conversely, in situations were more rigid materials are employed shorter graft polymeric moieties and linking moieties are employed.

The star polymer and polymeric network of this invention can be conveniently prepared by reaction of a graft polymer precursor having a reactive group which is reactive with an exterior surface moiety of the fractal polymer or by reacting the fractal polymer with a linking moiety precursor having at least two electrophilic or nucleophilic reactive groups one of which is reactive with a —$Z_1$ or —$Z_2$ exterior moiety of one fractal polymer and another of which is reactive with a —$Z_1$ or —$Z_2$ exterior surface moiety of another fractal polymer. Such moieties include those that react in conventional polymerizations reactions such as addition polymerization and condensation polymerizations. Illustrative electrophilic and nucleophilic groups include those described as useful for —$Z_1$ and $Z_2$ moieties of useful nuclei precursor monomers, branching precursor moieties and extension precursor moieties as described above, in the same preferences. For example, when the surface —$Z_1$ or —$Z_2$ moiety is a nucleophilic group such as —OH, —$NH_2$ or the like, the graft polymeric moiety precursor or linking moiety precursor may include a complimentary reactive electrophilic moiety such as —C(O)Cl, —N=C=O, —C(O)OH and the like in the required number. Similarly, where the surface —$Z_1$ or —$Z_2$ moiety is an electrophilic group such as N—C=O, —C(O)Cl or —C(O)OH, the graft polymeric moiety precursor or linking moiety precursor may include a complimentary nucleophilic group such as a —OH or —$NH_2$ in the required number.

In the preferred embodiments of this invention, the star copolymer and the polymeric network are formed either by the solution process or melt process of this invention. Both processes preferably involve the formation of amide or ester groups by reaction of an amine or hydroxy group and a carboxyl group in the presence of phosphite esters. In both processes, one of the reactants is the monofunctional precursor polymer of the linear polymeric moieties of the star polymer or the polyfunctional precursor of the linking moieties of the polymeric network which has a reactive group as for example an amine group, hydroxy group, or carboxyl group, and the other is one or more fractal polymer of this invention having exterior —$Z_1$ or —$Z_2$ moieties which are reactive with the reactive groups of the precursor polymer of the linear moieties or linking polymeric moieties.

In the solution and melt processes, the precursor polymers of the graft polymeric moieties of the star polymer are AB terminated polymers. That is, each end of the precursor polymers is terminated with a different functional group. If a substantial fraction of the linear precursor polymer chains are terminated at both ends by the same reactive group, then a strong tendency to form crosslinked networks ensues upon reaction at reasonable concentrations with the reactive groups of the fractal polymers. The most preferred precursor graft polymers are aliphatic polyamides or amorphous aromatic polyamides made exclusively or almost exclusively from AB monomers where A and B are different functional groups as for example an amine group and a carboxylic acid group such that each chain is terminated by a carboxyl group on one end and an amine group on the other such as nylon 6, nylon 7, nylon 4, nylon 3, nylon 8, nylon 11, nylon 12 and the like.

In the solution process for forming the polymeric network, the linking moiety precursor must include two or more A functional groups, where the exterior reactive —$Z_1$ or —$Z_2$ moieties of the fractal polymer are reactive with A functional groups or must include two or more B functional groups, where the exterior reactive —$Z_1$ or —$Z_2$ moieties of the fractal polymer are reactive with B functional groups. Therefore, polymers such as polyamides made from AA monomers and BB monomers such as nylon 66, nylon 610, nylon 612 and the like; acid or hydroxy terminated polyesters; hydroxy and amine terminated polyethylene oxides or polyamines; polymers and copolymers having two or more pendant acid functions such as poly(acrylic acid), partly hydrolized polyacrylamide, poly(ethylene-co-acrylic acid), poly(ethylene-co-methacrylic acid), poly(methacrylic acid), partly hydrolyzed poly(methacrylamide), poly(4-carboxylstyrene) poly(3-amino propyl methacrylate) and monomers such as adipic acid, sebacic acid, terephthalic acid, tetramethylene glycol, diamino xylylene and hexamethylene diamine; 4,4'-diamino benzanilide and the like are suitable for use.

In the first (solution) process, both reactants are dissolved in an aprotic solvent such as N,N-dimethylacetamide (DMAc) or N-methyl-2-pyrrolidinone (NMP) optionally in the presence of LiCl at temperatures higher than 115° C. Upon complete dissolution, an effective amount of one or more phosphite compounds and an effective amount of an organic base are added, and the reaction is allowed to proceed for a time sufficient to form the desired star polymer or the polymeric network, usually up to about 6 hours. In the solution process, the condensation is carried out in the presence of a base. Useful bases may vary widely. Illustrative of useful bases are organic bases such as tertiary amines as for example, imidazole, pyridine or trialkylamines. Preferred bases are tertiary amines and the most preferred base is pyridine.

The base is employed in an amount which is sufficient to promote the reaction of the fractal polymer and the linking moiety precursor or the graft polymeric moiety precursor to any extent. Preferably, the molar amount of base employed is about equivalent to the molar amount of the phosphite ester in the reaction mixture.

In the second (melt) process, the grafting reaction is conducted in the molten state at temperatures above the melting temperature of the linear precursor polymer of the graft polymeric moieties or the precursor of the linking moieties. Here, the reaction is carried out at temperatures much higher than in the solution process, and in the absence of the aprotic solvent, LiCl, and organic base. The highest graft efficiency occurs at temperatures in the range of from about 225° C. up to about 325° C.

In the solution process, the reaction is carried out at temperature equal to or greater than 115° C. and lower than the boiling point of the solvent. In the preferred embodiments of the invention, solution condensation process temperatures are from greater than about 115° C. to about 185° C., and more preferred reaction temperatures are from about 120° C. to about 155° C. The preferred temperature at which to conduct the graft reaction for any particular linear polymer depends on the nature of the flexible polymer. When the linear polymer is an aliphatic polyamide such as polycaprolactam (nylon-6), the preferred temperature is from greater than 115° C. to about 145° C., and the most preferred temperature is from about 120° C. to about 135° C. In the case where the linear polymer is poly(ethylene terephthalate) (PET) the preferred temperature is from about 140° C. to about 185° C., and the most preferred temperature is from about 165° C. to about 180° C. For each linear polymer family an appropriate reaction temperature may be used, usually dictated by the solubility of the linear polymer in the reaction solvent. In all cases, the reactions are conducted at temperatures higher than those prescribed by Yamazaki, Matsumoto and Higashi, *J. Polymer Sci.: Polym. Chem. Ed.,* 1975, 13, 1373. These authors found the condensation to proceed best at temperatures of 95° C.±15° C.

The melt and solution processes are carried out under conditions substantially similar to those employed in processes for the preparation of the fractal polymer of this invention. The melt and solution processes are carried out in the presence of and effective amount of one or more phosphite esters. Useful and preferred amounts of phosphite esters and reactants are as described below in the process for preparation of the fractal polymer. In the preferred embodiments of this invention, the quantity of the one or more phosphite esters employed is about equimolar with the number of linking groups (preferably amide or ester groups) expected to be formed during the grafting procedure, and the process is carried out in the presence of no or substantially no water over a period of time sufficient to produce the star polymer or polymeric network in the desired yield.

The polymeric network of this invention has many uses. For example, the network can be used to absorb liquids by matching the polarity of the liquid with the polarity of the linking moiety. For example, when the linking moiety is a polymeric moiety such as poly(acrylic acid), poly(methacrylic acid), partially hydrolyzed poly(acrylamide) or the like, then the network can be used to absorb more polar liquids such as water, ethanol, acetone and the like. When the linking moieties are polymeric moieties such as poly(ethylene-co-methacrylic acid), poly(ethylene-co-acrylic acid), poly(acrylamide) or the like, then the network can be used to absorb less polar liquids. Where most of the $-Z_1$ and $-Z_2$ on the fractal polymer and reactive sites on the linking moiety if any, are not used for crosslinking, the remaining $-Z_1$ and $-Z_2$ moieties and reactive sites can be used as prepared or after alteration for ion-exchange or selective filtration resins and/or membranes, and for slow drug release where the drug is bound to either the fractal or the linking moiety and the release is effected by hydrolysis of the bonds by body fluids.

Where the reactive groups $-Z_1$ and $-Z_2$ on the fractal polymer are different from those bonded to the linking moiety flexible segments in the network, a multi-purpose exchange resin or drug release material can be prepared; e.g., a concurrent positive and negative ion-exchange resin or membrane. The networks may be used as diagnostic substrates for proteins in medical and biochemical analyses.

The star polymer of this invention has many uses. For example, they are much more melt or solution processable than their linear analogues of the same molecular weight because of lower solution or melt viscosity. Because of their high molecular weight, the mechanical properties of the polymers in the solid state, such as ductility, tensile modules, strength and breaking strain are enhanced as compared with properties of linear polymeric of lower molecular weight. The addition of star polymers to linear compatible polymers results in a composite blend having properties which are superior to those in the linear polymer. The star copolymer of this invention is also useful as a compatibilizer to increase the homogeneity of a blend of two or more polymers. For example, the star copolymer may be substituted with two types of graft moieties one compatible with one component and the compatible with the other correspond.

The star polymer of this invention is especially useful as a precursor in the formation of the molecular composite of this invention which comprises a polymeric matrix which comprises a crystalline polymer, amorphous polymer or a combination thereof having dispersed therein at the nanometer scale (average radius equal to or less than about 1000 nm, preferably from about 500 to about 5 nm and more preferably from about 100 to about 10 nm) a star polymer of this invention. The polymers that may serve in the polymeric matrix may vary widely. Useful polymers include thermoplastic polymers such as poly(esters), poly(amides), poly(carbonates), poly(acrylics), poly(vinyls), poly(olefin), poly(ester carbonates), poly(etherketones), poly(etheretherketones), poly(oxides), poly(sulfides) and the like. Preferred thermoplastic polymers are polyesters such as poly(ethylene terephthalate), and poly(ethylene naphthalate) and polyamides such as the aliphatic polyamides and the amorphous polyamides described below as precursor for the graft polymeric moieties of the star copolymer. Polyamides are more preferred and nylon polyamides, especially nylon 6, nylon 4, nylon 12, nylon 11 and nylon 66, nylon 610 and nylon 64 are most preferred.

The amount of matrix polymer contained in the molecular composite may vary widely, depending on the uses, but is usually at least about 50 weight percent based on the total weight of the composite. The amount of matrix polymer contained in the molecular composite is preferably from about 50 to about 99% by weight, more preferably from about 70 to about 98% by weight and most preferably about 80 to about 95% by weight based on the total weight of the molecular composite.

The molecular weight of the polymer forming the polymeric matrix of the composite may vary widely. In general, the molecular weight of the matrix polymer is sufficiently high such that such polymer can form a solid molecular composite. In the preferred embodiments of the invention where the matrix polymer is a polyamide, its number average molecular weight is preferably at least about 5000.

The particular star copolymer for use in fabrication of the composite of this invention may vary widely, and will depend primarily on the polymers or copolymers forming the matrix. The star copolymer is selected such that the graft polymeric moieties are generally compatible with the polymer or polymers forming the matrix. The graft polymeric moieties preferably include the same or substantially the same recurring monomeric units as the polymer(s) or copolymer(s) of forming the matrix. In the preferred embodiments of the invention, graft polymeric moieties of the star copolymer include the same or substantially the same recurring monomeric units as the polymer(s) of the matrix described above.

The number average molecular weight or number of repeating units in the graft polymeric moieties of the star polymer included in the molecular composite of this invention is critical. To enhance the dispersion of the star copolymer in polymer matrix to the desired extent, precursor polymers used to form the graft polymeric moieties of the star copolymer are preferably sufficiently long to co-crystallize with the matrix polymer where the matrix polymer and the graft polymeric moieties of the star copolymer are crystalline polymers, or to form a stable solid solution in cases where the flexible graft polymer chains of the star copolymer and the matrix polymer tend to form amorphous solids. In the case where the graft polymeric moieties of the star copolymer are of polyamides, typified by poly(caprolactam), the graft polymeric moieties of the star copolymer preferably include at least about 20 repeat units; that is for poly(caprolactam), have a number average molecular weight $M_n$ preferably of at least about 2500. In the case where the graft polymeric moieties of the star copolymer are polyesters such as polyethyleneterephthalate (PET), the $M_n$ of the polymeric moieties of the star copolymer is not less than about 4000. In the case where the polymeric moieties of the star copolymer are polyolefins, the $M_n$ is equal to or greater than about 2000. For example, the respective minimal $M_n$ is preferably about 2000 for polyethylene and preferably about 3000 for polypropylene. There is no upper limit to the number average molecular weight of the graft polymeric moieties of the star copolymer, provided that the number average molecular weight is not too high to hamper processing.

The amount of the star copolymer in the molecular composite may vary widely. It is limited from below by the magnitude of the desired property enhancement, and from above by processing limitations such as temperature, torque and the like. Usually, the amount of the star copolymer contained in the molecular composite is at least about 0.5% by weight, and may reach up to 100% by weight of the molecular composite. Preferred amounts are from about 0.5% to about 50% by weight, more preferred amounts are from about 2% to about 30% and most preferred amounts are from about 5% to about 20% by weight of the molecular composite.

The molecular composite of this invention may include various optional ingredients known for use in molecular composites. Such optional components include fibrillar and non-fibrillar fillers, plasticizers, impact modifiers, colorants, mold release agents, antioxidants, ultraviolet light stabilizers, lubricants, antistatic agents, fire retardants, and the like. The optional components are well known to those of skill in the art and will not be described herein in detail.

The molecular composite of this invention can be obtained by conventional melt blending the matrix polymer and graft star copolymer of this invention, and various optional components to the extent necessary to obtain the desired dispersion. The manner in which the melt is formed is not critical and conventional methods can be employed. For example, the melt can be formed through use of conventional polymer and additive blending means, in which the polymeric components are heated to a temperature equal to or greater than the melting point of at least one of the polymers, and below the degradation temperature of each of the polymers. In a particularly preferred embodiment of this invention, the polymers are heated above the melting point of the matrix polymer and the graft polymeric moieties of the star copolymers. The melt is then vigorously stirred until the desired dispersion of the graft copolymers in the matrix is obtained.

In the most preferred embodiment, the various essential and optional components can be granulated, and the granulated compounds mixed dry in a suitable mixer, as for example, a tumbler or a Branbury Mixer, or the like, as uniformly as possible. Thereafter, the composition is heated in an extruder or melt blender until the graft polymeric moieties of the star copolymer and the matrix are melted. The mixture is maintained at that temperature and vigorously mixed until the desired dispersion of the star copolymer in the matrix is obtained. The molecular composite is thereafter ejected with cooling.

The molecular composite of this invention can be used for conventional purposes. For example, the molecular composite of this invention can be used to form injection molded elements, melt-spun fibers of high modules and tenacity, unoriented or oriented films with high strength, and the like.

The following examples are presented to more particularly illustrate the invention and are not to be construed as limitations thereon.

EXAMPLE I

I. Preparation of AB-fractal polyamide with amine reactive sites

In about 500 ml solution of 5% LiCl in N,N-dimethylacetamide (DMAc), there were dissolved 0.01 mol (2.143 g) 3,3-diaminobenzidine at about 100° C. The 3,3-diaminobenzidine molecules serves as nuclei for the subsequent growth of fractal polymer. To this solution there were added dropwise from two dropping funnels (1) a 1:1 vol/vol mixture of DMAc and 55 ml triphenylphosphite (TPP) and at a much slower rate, (2) a 1:1 molar mixture of 0.16 mol (21.94 g) 4-aminobenzoic acid and 0.16 mol (24.344 g) 3,5-diaminobenzoic acid in a mixture of about 30 ml pyridine and 400 ml DMAc. The reaction mixture was constantly stirred and maintained at ca. 110° C. The dropwise addition of the two mixtures took about 6 hours, after which the reaction was continued for not less than 3 hours. It was then poured into a very large excess of methanol and after filtration carefully washed in methanol, tap water, boiling water and methanol again. The reaction produced a stiff AB-type fractal polyamide with about 64 amine end groups per molecule. The intrinsic viscosity of the polymer was 0.17 dL/g and light scattering indicated its weight average molecular weight was $M_w$=24,600. Subsequent reaction with 4-iodobenzoic acid, careful purification and I,C,H,N element analysis and mass balance indicated the presence of accessible amine reactive groups in about the expected amount (64 amines per molecule). The product was coded A2105-72A.

II. Preparation of AB-fractal polyamide with carboxylic acid reactive sites

In 200 ml DMAc there were dissolved 0.00224 mol (0.47 g) 1,3,5-benzenetricarboxylic acid. To this there were added 0.25 mol pyridine and 0.20 mol TPP dropwise throughout the condensation reaction. After dissolution, a solution in 200 ml DMAc of 0.1 mol (18.12 g) 5-aminoisophthalic acid and 0.1 mol (13.71 g) 4-aminobenzoic acid was added dropwise from a separate dropper to the solution containing the 1,3,5-benzenetricarboxylic acid. The addition took six hours and the reaction was allowed to continue for an extra hour, all at 115° C. After completion, the product was worked up as before. This reaction produced a stiff AB-type fractal polyamide with about 64 carboxylic acid end groups per molecule. The intrinsic viscosity of the polymer was 0.17 dL/g and its $M_w$=14200. Reaction with 4-iodoaniline followed by mass balance and I,C,H,N element analysis confirmed that there exist close to 64 accessible carboxylic acid groups per molecule. The product was coded A2105-78B.

III. AB-Type Fractal Polyamides

AB-type fractal polyamides having amine and carboxylic reactive sites and their physical properties are set forth in the following Table 5.

TABLE 5

| | AB-Type Fractal Polyamides Prepared | | | | |
| --- | --- | --- | --- | --- | --- |
| Code | Number of $NH_2$ groups per molecule | Number of carboxyl groups per molecule | [η] dL/g in $H_2SO_4$ | $M_w$ | $R_H$, Å |
| A2105-78B | — | 64 | 0.17 | 14,200 | 21.9 |
| A2105-69B | — | 12 | 0.13 | 16,000 | 17.3 |
| A2105-72A | 64 | — | 0.17 | 24,600 | 19.6 |
| A2105-72B | 48 | — | 0.17 | 22,400 | 20.0 |
| A2105-74A | 48 | — | 0.18[a] | | |
| A2105-69A | 6[b] | — | 0.32 | 46,800 | 32.0 |

[a]In DMAc/5% LiCl
[b]First run of series; some interfractal linking took place.

EXAMPLE II

Alterations of Reactive Groups on the Exterior of AB-Type Fractal Polyamides I. Ester terminated AB-fractal polyamides A 48-amine AB-type fractal polyamide was prepared as described above using trifunctional nuclei (prepared from 0.5 g 1,3,5-benzenetricarboxylic acid and 1.4 g 1,4-phenylenediamine) and 0.1 mol (15.25 g) 3,5-diaminobenzoic acid and 0.1 mol (13.71 g) 4-aminobenzoic acid. When the reaction was completed, a large excess of mono-methylterephthalate was added and the reaction was allowed to continue for 3 additional hours. Work up was as before. NMR analysis indicated that all the free amines were reacted to produce exclusively methyl ester-terminated FPs. From the ratio of methyl to aromatic carbons in the NMR scans, it was found that each polymer molecule is associated with close to 48 ester groups. The product was coded A2105-79B.

II. Potassium carboxylate terminated AB-fractal polyamides

The carboxyl-terminated FP A2105-78B was dissolved in DMAc at over 80° C. To this solution a slight molar excess of KOH in methanol was added, resulting in gradual precipitation. After workup in methanol and acetone, the dried polymer contained over 16.0% by weight potassium. This product was coded A2105-82G.

III. AB-Type Fractal Polyamides Having Altered Reactive Groups

AB-Type fractal polyamides having altered exterior reactive groups and their physical properties are set forth in the following Table 6.

TABLE 6

AB-Type Fractal Polyamides with Altered Reactive Groups

| Code | Precursor | Number of Reactive End Groups | Starting End Groups | Altered End Groups | Remarks |
|---|---|---|---|---|---|
| A2105-82G | A2105-78B | 64 | carboxylic acid | K$^+$ carboxylate | (a) |
| A2105-79B | A2105-72B repeat | 48 | amine | methyl ester | (b) |
| A2105-81C | A2105-79B | 48 | methyl ester | 2-hydroxyethyl ester | (c) |

(a) obtained by neutralization with KOH/methanol solution at T > 80° C.
(b) obtained by Yamazaki reaction with monomethyl terephthalate. [η] = 0.12 dL/g, M$_w$ = 14,100 and R$_H$ = 20.3Å
(c) obtained by transesterification with ethylene glycol in presence of ZnCl$_2$ catalyst. Reaction carried at 180° C. in ethylene glycol as reagent/solvent

EXAMPLE III

Preparation of Star Co-Polymers in Solution

I. Typical Solution Preparation Procedure for Star Nylon (A2105-73B)

In a 2000 ml round bottom flask there were dissolved 50 g nylon- 6 (M. W.=33,200 by light scattering) in 1050 ml DMAc/5% LiCl at 135° C. After lowering the temperature to 120° C., there were added 0.5 g of the 48-amine AB-type fractal polyamide A2105-72B. After dissolution the temperature was lowered to 115° C. whence excess molar of pyridine and TPP were added to the solution. A normal Yamazaki reaction was then carried at 115°±5° C. for 6 hours. Small increments of A2105-72B (less than 0.05 g), pyridine and TPP were then added to ensure the complete reaction of all the nylon. The low temperature of the reaction was set in order to prevent the aliphatic amines at the chain-ends of the nylon from reacting, and to limit the reaction to only the aromatic amines of A2105-72B and the carboxyl groups at the other end of the nylon chains. Work up was conducted as usual: precipitation in methanol, followed by filtration and wash in methanol, tap water, boiling water and methanol again. The product of this procedure, coded A2105-73B, was found by light scattering to have M$_w$=127,000. It's intrinsic viscosity was [η]=1.39 dL/g. The combination of very high molecular weight and relatively low intrinsic viscosity (compared to [η]=1.2 dL/g for the precursor nylon) indicates the material to be a branched star shaped material with 4 arms per star.

Various star polyamides prepared and their properties are set forth in the following Table 7.

TABLE 7

Polyamides Prepared in Solution[a]

| Code | Made from fractal polyamide | M$_w$, light scattering | [η], dL/g | # of arms in star |
|---|---|---|---|---|
| A2105-71A | 6-amine A2105-69A | 300,000 | 1.75 | 9 |
| A2105-73B | 48-amine A2105-72B | 127,000 | 1.39 | 4 |
| A2105-76A | 48-amine A2105-72B | 63,500 | 1.31 | 2 |
| A2105-75A | 48-amine A2105-72B | 45,000 | 1.12 | 1.5 |

[a]All graft polymeric moieties are nylon-6, M$_w$ = 33,200. Sample A2105-71A contains 1.33% FPs while all other samples contain only 1.0% FPs.

II. Typical melt preparation procedure for Star-Polyester (Coded A1971-50H)

Poly(ethylene terephthalate)(PET) (60 g) is ground and then dried under dynamic vacuum at ca. 130° C. overnight. A2105-82G (0.6 g, 1.0% by weight of the PET) are mixed with 0.91 g triphenylphosphite (1.5% TPP). This mixture is added to the PET and thoroughly mixed in a sealed vessel by shaking and tumbling. The well mixed mixture is then melt blended at a nominal temperature of 270° C. in a Haake Rheocord 90 instrument for up to 20 minutes. In the present work, most of the melt blending took place with the rotors operating at 50 rpm. At the end of the runs, the instrument was opened and the blended polymer collected and then characterized. Its intrinsic viscosity was measured in a tetrachloroethane/phenol mixed solvent and the molecular weight, M$_w$, was determined by light scattering from solutions of the polymers in hexafluoroisopropanol. Since the torque on the rotors of the Haake Rheocord 90 machine directly reflects the melt viscosity of the polymer being processed in it, a comparison of torques obtained from different samples under otherwise identical conditions, gives an indication of the melt viscosities and relative levels of grafting of the PET onto the fractal polyamides. Reaction conditions and star polyester properties are set forth in the following Table 8. In Table 8 below, all runs were conducted under the identical conditions of temperature=270° C., rotors speed=50 rpm and residence time=20 minutes.

TABLE 8

Star-Polyester Preparation in the Melt at 270° C.

| Code | Fractal Polymer | TPP | Torque, m.g. | [η] dL/g | $M_w$ |
|---|---|---|---|---|---|
| A2105-82B | None | None | 36 | 0.49 | — |
| PET-2nd | None | None | 62 | 0.53 | |
| PET average | None | None | 49 ± 13 | 0.50 ± 0.03 | 40,000 |
| A1971-50B | None | 1.5% | 98 | 0.52 | 43,000 |
| A1971-55A | 1% A2105-69A | 1.5% | 47 | | |
| A1971-55B | 1% A2105-72A | 1.5% | 93 | | |
| A2105-82D | 1% A2105-79B | None | 41 | 0.47 | |
| A1971-55C | 1% A2105-79B | 1.5% | 140 | | |
| A1971-50C | 1% A2105-78B | 1.5% | 88 | 0.53 | |
| A1971-50D | 1% A2105-79B | 1.5% | 57 | 0.50 | |
| A2105-82K | 1% A2105-82G | None | 16 | 0.46 | |
| A1971-50H | 1% A2105-82G | 1.5% | 259 | 0.65 | 169,000 |
| A1971-53B | 1% A2105-82G | 1.5% | 435 | 0.84 | 150,000 |
| A1971-53B-R | 1% A2105-82G | 1.5% | 404 | 0.74 | 120,000 |

EXAMPLE IV

Preparation of Networks from AB-type Fractal Polyamides

All networks were prepared from AB-type fractal polyamides and additional reactants in solution. Therefore, the networks were first obtained as their swollen gels. After careful washing several times over in liquids such as methanol, water, etc., the gels were dried and the dry networks obtained. The procedure of Yamazaki et al. *J. Polymer Sci. Polym. Chem. Ed.* 13, 1373 (1975) was employed in most instances to prepare the networks. Otherwise, our modification where the condensation takes place at 130° C. and higher was used. The nature and amounts of the fractal polyamides and the second network components, as well as the concentration of the network products in the reaction product gels, are listed in Table 9 below.

Networks A2105-74B and A2105-77 demonstrate that networks consisting mostly of fractal polyamides can be prepared. Importantly, these and the other networks contain a large number of accessible amine groups capable of serving in various functions such as substrates for protein analyses, ion exchange resins or membranes, etc. Networks A2105-74C and A2105-75B are highly swellable in appropriate fluids. In A2105-74C the long nylon-6 network segments were found to be swellable in fluids such as DMAc/5% LiCl, conc. sulfuric acid and formic acid. All these are solvents for uncrosslinked nylon-6. In A2105-75B, the long poly(acrylic acid) network segments were swellable in fluids which are common solvents for normal poly(acrylic acid), such as water, acetone and ethanol. Separate reactions of dry A2105-75B with 4-iodobenzoic acid and 4-iodoaniline, followed by purification and iodine element analysis demonstrated the presence of substantial amounts of reactable amines and carboxyls. This indicates that A2105-75B can be used in the swollen gel state as positive and negative ion-exchange resins or membranes.

EXAMPLE V

Preparation of Star Co-Polymers in Solution

TABLE 9

Networks Prepared from AB-type Fractal Polyamides

| Code | Network Conc. in Reaction Mixture | FP Precursor | wt. of FP in Mixture | Second Network Component | Wt. of Second Network |
|---|---|---|---|---|---|
| A2105-74B | 10% | 64-amine A2105-72A | 10.0 g | Decanedicarboxylic acid | 0.7 g |
| A2105-77 | 10% | 64-amine A2105-72A | 12.0 g | 4,4"-dicarboxy-triphenylene diamide | 1.0 g |
| A2105-74C | 10% | 64-amine A2105-72A | 6.6 g | A2105-51B1 dicarboxy-terminated nylon-6 of D.P. ~ 30 | 4.4 g |
| A2105-75B | 7.5% | 64-amine A2105-72A | 1.0 g | poly(acrylic acid) M.W. = 250,000 | 10.0 g |

I. Typical Solution Preparation Procedure for Star Nylon (A2105-90)

In a 2000 ml round bottom flask there were dissolved 10 g nylon-6 and 10 g of an amorphous linear aromatic polyamide coded A2105- 61E in 650 ml DMAc/5% LiCl at 135° C. After lowering the temperature to ~120° C., there were added 2.0 g of the 48-amine AB-type fractal polyamide A2105-72B. After dissolution the temperature was lowered to 121° C. whence 5 ml of pyridine and 17 ml of TPP were added to the solution. The mixture increased in viscosity rapidly and the reaction was stopped by dumping the reaction mixture into methanol. Work up was conducted as usual: The precipitate was collected by filtration and wash in methanol, tap water, boiling water and methanol again. The product of this procedure was coded A2105-90. The star polymer is useful as a compatibilizer for blends of nylon 6 and the amorphous linear aromatic polyamide coded A2105-61E or similar amorphous polyamides.

EXAMPLES VI and VII and COMPARATIVE EXAMPLES I and II

Preparation of Fractal Aromatic Polyamides Containing AA and BB and monomers.

A. General Procedure

In a 2000 ml round bottom flask equipped with a magnetic stirring egg and immersed in a silicone oil bath, there were dissolved with warming the appropriate monomer mixture designed to produce the desired segment length between branchpoints, and the desired branchpoint functionality. The solvent of choice was N,N-dimethylacetamide and the monomer concentration was kept at 5 wt/vol % or lower. Once the monomers dissolved, a slight molar excess of pyridine was added. When the solution temperature reached about 100° C., a slight molar excess of triphenylphosphite was added. The reaction was then allowed to continue for up to 6 hrs at 100° 115° C. Then the reaction was terminated and the fractal polymers precipitated in large excess of methanol. The fractal polymers were then washed repeatedly in non-solvents such as hot methanol, acetone and water. The fractal polymers were finally dried under dynamic vacuum at about 135° C. until reaching constant weight.

B. Examples VI and VII

A monomer mixture containing 5:2:5 aminobenzylcyclohexylamine (ABCHA)/1,3,5-benzenetricarboxylic acid (BTCA)/p-aminobenzoic acid (PABA) was used to prepare fractal polymers (coded A2639-10A). Analysis revealed that the fractal polymer coded A2639-10A had an intrinsic viscosity of 0.28 dL/g, weight average molecular weight (Mw) of 63,000 and hydrodynamic radius of 32 Angstroms.

A monomer mixture containing 5:2:5 4,4'-diaminobenzanilide (DABA)/BTCA/PABA was used to prepare fractal polyamide polymers (coded A2639-10B). The intrinsic viscosity of the fractal polymer was 0.20 dL/g, their Mw was 23,000 and hydrodynamic radius 16 Angstroms.

Both the above polymeric products were highly branched with the segment length between branchpoints being about 7 or fewer aromatic rings. They remained soluble in solution and attained rather high molecular weight.

C. Comparative Examples I and II

In order to increase the segment length between branchpoints, a different ratio of the same monomers as in EXAMPLES VI and VII above was used. Here, 2:2:11 molar ratio of ABCHA/BTCA/PABA (coded A2639-17) and 2:2:11 molar ratio of DABA/BTCA/PABA (coded A2639-21) were employed. All other conditions were kept identical with those of EXAMPLES III and IV. Precipitation of low molecular weight polymeric product started during the polymerization, and the precipitate could not be redissolved in the reaction mixture. The Mw of A2639-17 was measured and found to be only 4300 and the ratio of Mw/Mn was only 2.1. Simple arithmetic shows that this product contains, on the average, only 17 aromatic rings and is of too low degree of polymerization to behave as a fractal polymer. Wideangle x-ray diffraction patterns were obtained from A2639-17 and A2639-21 and revealed that both produce crystalline diffraction patterns very similar to those reported in the literature for linear aromatic polyamides (cf. S. M. Aharoni, *Macromolecules*, 20,2010 (1987)). The obtained products are, then, very low molecular weight close to linear aromatic polyamides. They are unsuitable for the desired purpose of this invention. We conclude, then, that when the average length of stiff aromatic segments is too long, they tend to crystallize during polymerization and precipitate out of solution as a very low molecular weight product. This appears to take place when the average length of the stiff segments between branchpoints surpasses ten para-substituted aromatic rings.

EXAMPLE VIII

Preparation Of Blends Of Fractal Polymers In Nylon-6

I. General Procedures

1. Solution Blending a) Solutions of fractal polymers in hot N,N-dimethylacetamide (DMAc) and of nylon-6 in hot DMAc containing 3% to 5% dry LiCl were separately prepared. Polymer concentration in each was 5 wt/vol % or higher. The solutions were then mixed in the desired proportions designed to yield the desired amount of fractal polymers in the nylon-6 matrix. In all cases, the fractal polymers were kept as the minor component and the nylon-6 as the major component of the blend. The mixed solutions were stirred hot for several hours and finally poured into methanol where all the polymer blends precipitated out. The blend was filtered and washed carefully to remove all the solvent and LiCl. After drying, specimens were molded, quick quenched and allowed to equilibrate with air humidity. The mechanical and other properties of the specimens were then measured.

2. Melt Blending

Powdered fractal polymers were mixed with coarsely ground nylon-6 in the desired proportion. The mixture was then melt blended in a Haake Rheocord-90 instrument at ca. 250° C. for up to 6 minutes. The discharged blend was rather uniform in appearance and its thermal transitions were very similar to those obtained from solution blended blends of identical compositions.

I. Evaluation

The thermal transitions of the blends were evaluated using standard differential calorimetry by heating the blend from room temperature (i.e. about 25° C.) under inert atmosphere at a heating rate of 20° C. per minute to a temperature of 300° C. In two heating cycles, and collecting data from the second heating cycle. The composition of the test blends and evaluation results are set forth in the following Tables 10 and 11.

TABLE 10

Samples using Nylon-6 (LSL grade) and A2639-10A Fractals, Solution or Melt-Blended.

| Sample Code | Ratio N6/Fractals | $T_g$, C | $T_m$, C | Solution/melt |
|---|---|---|---|---|
| A2639-12E | 100/0 | 51.5 | 221.4 | solution |
| A2639-15A | 100/0 | 51.2 | 220.1 | melt |
| A2639-13D | 95/05 | 65.0 | 217.4 | solution |
| A2639-15B | 95/05 | 60.2 | 218.7 | melt |
| A2639-13C | 90/10 | 75.2 | 216.7 | solution |
| A2639-15C | 90/10 | 67.6 | 220.1 | melt |
| A2639-13B | 85/15 | 76.8 | 214.6 | solution |
| A2639-15D | 85/15 | 75.2 | 217.7 | melt |
| A2639-13A | 80/20 | 75.7 | 214.7 | solution |
| A2639-15E | 80/20 | 76.3 | 216.4 | melt |

TABLE 11

Samples using nylon-6 (LSL grade) and A2639-10B Fractals, Solution or Melt-Blended.

| Sample code | Ratio N6/Fractals | $T_g$, C | $T_m$, C | Solution/melt |
|---|---|---|---|---|
| A2639-12E | 100/0 | 51.5 | 221.4 | solution |
| A2639-15A | 100/0 | 51.2 | 220.1 | melt |
| A2639-12D | 95/05 | 65.4 | 218.8 | solution |
| A2639-14B | 95/05 | 66.1 | 219.6 | melt |
| A2639-12C | 90/10 | 67.8 | 217.7 | solution |
| A2639-14C | 90/10 | 68.9 | 218.1 | melt |
| A2639-12B | 85/15 | 82.9 | 218.4 | solution |
| A2639-14D | 85/15 | 74.9 | 215.0 | melt |
| A2639-12A | 80/20 | 81.9 | 216.4 | solution |
| A2639-14E | 80/20 | 80.9 | 213.2 | melt |

The dramatic increases in $T_g$ with increases in the amount of fractal polymers in the blends indicate that blending on a molecular scale was achieved. It also indicates very intimate interpenetration of nylon chains into the rather open highly branched fractal polymers. It should be noted that the glass transition temperature of the fractal polymers, if it altogether exists, is above their thermal degradation temperature, over 350° C.

COMPARATIVE EXAMPLE III

A blend containing about 35% colloidal silica particles and 65% nylon-6 was prepared by thoroughly mixing their solutions in compatible solvents, thoroughly evaporating all solvents, and finally drying up under vacuum at 90° C. to obtain a uniform solid blend. The nylon-6 was dissolved in a 2:1 vol/vol mixture of trifluoroethanol and chloroform. The colloidal silica was "dissolved" (actually suspended) in isopropanol. It is characterized by uniformly dense, essentially spherical particles about 100 Angstroms in diameter. It is supplied by Nissan Chemical Industries, Ltd., of Tokyo, Japan, under the tradename Organosilicasol, Type IPA-ST. The preparation contains about 30% amorphous silica particles dispersed in isopropanol.

The fully dried blend was tested by Differential Scanning Calorimeter (DSC) and the glass transition temperature of the blend was found to be 51.7° C., essentially the same as that of pure nylon-6. From the immutability of the glass transition we conclude that nylon chains could not penetrate into the dense silica particles, and their mobility was not affected by the presence of these particles. Chains of nylon-6 must be interpenetrated into the FPs in order for their mobility to be restricted and the glass transition elevated. If the interpenetration does not occur, the $T_g$ is not elevated.

EXAMPLE IX

Blends were prepared containing 87.5% Nylon-6 and 12.5% fractal polymers of two kinds A72639-10A and A2639-103. Then tensile specimens were molded and quick quenched. After equilibration with atmosphere containing 50% relative humidity, the specimens were tested using an Instron Testing Machine to determine the Youngs modulus using standard ASTM test methods the yield strength and the yield elongation using standard ASTM test methods. The results are tabulated below in Table 12.

TABLE 12

Physical Characteristics of Compression-Molded Specimens:

| Sample Code | N-6/Fractals Ratio | Fractal code | Tg, °C. | Young's modulus (psi) | Yield Strength (psi) | Yield El. (%) |
|---|---|---|---|---|---|---|
| A2639-16A | 87.5/12/5 | A2639-10B | 74.8 | 254,900 | 5920 | 4.8 |
| A2539-16B | 87.5/12.5 | A2639-10A | 67.6 | 234,600 | 6020 | 5.3 |
| Nylon-6 | 100/0 | None | 51.5 | 166,100 | 4400 | 6.7 |

The intrinsic viscosities of all the above samples fell in the narrow interval of 1.21–1.16 dL/g. The % crystallinity of all quick-quenched specimens was 15%, identical for the three samples. The melting points of the three samples fell in the interval of 220.7° to 217.0° C., almost identical and within the range of pure nylon-6.

EXAMPLE X

A series of experiments were carried to determine the effect of fractal polymers on the melt viscosity of a blend of nylon 6 (N-6) and various fractal polymers. Melt viscosities (in Pa.s) were obtained at 260° C. at 10 rad/sec. All the results were obtained in a parallel-plate rheometer. The results are set forth in the following table 13.

TABLE 13

| Sample code | N-6 Ratio of Fractal | Fractal code | Melt Viscosity (Pa · s) |
|---|---|---|---|
| A2639-12E | 100/0 | None | 161 |
| A2639-13D | 95/05 | A2639-10A | 344 |
| A2639-13C | 90/10 | A2639-10A | 317 |
| A2639-13B | 85/15 | A2639-10A | 435 |
| A2639-13A | 80/20 | A2639-10A | 380 |
| A2639-12D | 95/05 | A2639-10B | 469 |
| A2639-12C | 90/10 | A2639-10B | 432 |
| A2639-12B | 85/15 | A2639-12B | 504 |
| A2639-12A | 80/20 | A2639-10B | 462 |

The results in table 13 indicate that the addition of over 20% fractal polymers to nylon-6 does not prevent its melt processing and that it can be molded, extruded or melt-spun under conditions relatively close to those used for the processing pure nylon-6.

What is claimed is:

1. A three-dimensional, branched porous fractal polymer comprising:

a.) one to four aromatic nuclei of the formula:

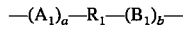
   $$-(A_1)_a-R_1-(B_1)_b-$$

b.) a branched polymeric moiety bonded to and projecting away from said nuclei having
   i.) branching recurring monomeric units of the formula:

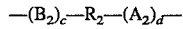
   $$-(B_2)_c-R_2-(A_2)_d-$$

and
   ii.) nonbranching monomer units of the formula:

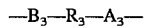
   $$-B_3-R_3-A_3-$$

in a ratio of between about 0.25 to about 1 moles branching recurring units to between about 0 to 1 mole nonbranching units, said nonbranching monomer units bonded to themselves, to said branching monomeric units or combinations thereof, wherein:
   —$R_3$ is the same or different and are selected from the group consisting of $R_1$ and $R_2$ divalent moieties; and c.) a plurality of pendant moieties on the exterior of said fractal polymer and bonded thereto, said pendant moieties of the formula:

   $$-Z_1$$

when d is greater than c, and said pendant moieties of the formula:

   $$-Z_2$$

when c is greater than d,
   a portion of said branching recurring monomeric units, said nonbranching monomer units, or a combination thereof having one or more terminating groups of the formula: $(B_2)_c-R_2-(Z_1)_d$, $-(A_2)_d-R_2-(Z_2)_c-$, $B_3-R_3-Z_1$ or $-A_3R_3-Z_2$, or a combination thereof; wherein:
   a and b are different and are integers equal to 0, or equal to or greater than 3, with the proviso that a or b is 0;
   $R_1$ is a polyvalent aromatic group selected from the group consisting of phenyl, biphenyl, and naphthyl, or is an aromatic moiety comprising two or more aromatic groups linked together by a linking moiety selected from the group consisting of ester, urethane and amide;
   $R_2$ and $R_3$ are the same or different at each occurrence and are a polyvalent aromatic group selected from the group consisting of phenyl, naphthyl, and biphenyl;
   —$Z_2$ is the same or different at each occurrence and is a nucleophilic group selected from the group consisting of —OH, —$NH_2$, —$N(R)_3^+$, —C≡N, and —$C(O)N(R)_2$, where R is the same or different and is selected from the group consisting of hydrogen, alkyl with at least one carbon, aryl with at least six carbons, and aralkyl with at least seven carbons, which is capable of reaction with a —$Z_1$ group to form a covalent bond or a derivative thereof;
   —$Z_1$ is the same or different at each occurrence and is an electrophilic group selected from the group consisting of —C(O)OH, —N=C=O, —C(O)Cl, —C(O)OR, and C(O)OM, where M is a monovalent cation selected from the group consisting of $NH_4^+$, $Na^+$, $K^+$, $Li^+$, $Cu^+$, and $Ni^+$, which is capable of reaction with a —$Z_2$ group to form a covalent bond or a derivative thereof;
   $A_1$, $A_2$ and $A_3$ are the same or different at each occurrence and are the residue of a nucleophilic group formed by a reaction between a nucleophilic group $Z_2$ and an electrophilic group $Z_1$;
   $B_1$, $B_2$ and $B_3$ are the same or different at each occurrence and are the residue of an electrophilic group formed by reaction between a nucleophilic group —$Z_2$ and an electrophilic group —$Z_1$; and
   c and d are different and are integers equal to or greater than 1, with the proviso that the sum of c and d is equal to or greater than 3, and with the further proviso that when a is equal to 0 then d is greater than c and that when b is equal to 0 then c is greater than d.

2. A fractal polymer according to claim 1 wherein —$R_1$—, —$R_2$— and —$R_3$— are the same or different and are a polyvalent group of the formula:

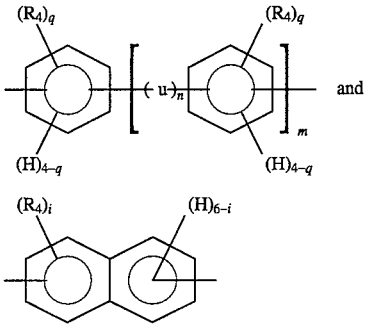

wherein
q is an integer from 0 to 4;
i is an integer from 0 to 6;
m is 0 or an integer equal to or greater than 1;
n is 0 or 1;
U is the same or different at each occurrence and is —O—, —S—, —$SO_2$—, —$N(R_5)$—, —$N(R_5)C(O)N(R_5)$—, —N=N—, —$N(R_5)$, —$N(R_5)C(O)$—, —$C(O)N(R_5)$—, —S(O)—, —C(O), —C(O)O—, —OC(O)— or —[](C($R_5$)($R_6$)[]])$_p$—;
$R_4$ is the same or different at each occurrence and is selected from the group consisting of alkyl with at least one carbon, aryl with at least six carbons, alkoxyaryl with at least seven carbons, alkylaryl with at least seven carbons, arylalkyl with at least seven carbons, alkoxy with at least one carbon, alkoxyalkyl with at least two carbons, nitro, cycloalkenyl with at least six carbons, halo, cyano, cycloalkyl with at least six carbons or aryloxy with at least six carbons; and $R_5$ and $R_6$ are the same or different and are hydrogen, alkyl with at least one carbon or aryl with at least six carbons.

3. A fractal polymer according to claim 2 wherein:

$R_4$ is the same or different at each occurrence and is alkyl with at least one carbon, alkoxy with at least one carbon, aryl with at least six carbons, phenoxy with at least six carbons or halo; and q, h and i are the same or different and are 0 or 1;
n is 0 or 1;
m is 0 or 1;
p is 1 or 2;
U is —O—,—S(O$_2$)—,—N(H)C(O)N(H)—, [[](—C(R$_5$R$_6$)—)[]]$_p$, —C(O)—, —N(R$_5$)—,—C(O)O— or —N(H)C(O)—; and $R_5$ and $R_6$ are the same or different at each occurrence and are hydrogen or alkyl of from 1 to 4 carbon atoms.

4. A fractal polymer according to claim 3 wherein;

U is —O—, S(O)$_2$—, [[](—C(R$_5$)(R$_6$)—[]])$_p$, —N(R$_5$)— or —C(O)—;
$R_5$ is hydrogen; and
$R_6$ is hydrogen or methyl.

5. A fractal polymer according to claim 4 wherein —R$_1$—, —R$_2$— and —R$_3$— are the same and are different and are a polyvalent moiety of the formula:

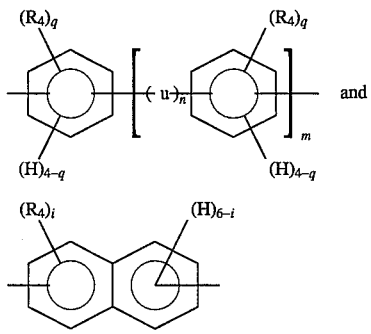

wherein:
$R_4$ is alkyl with at least one carbon;
n is 1 or 0;
m is 1 or 0;
U is —N(R)$_5$—; and
q is 0 or 1.

6. A fractal polymer according to claim 5 wherein m is 0.
7. A fractal polymer according to claim 6 wherein q is 0.
8. A fractal polymer according to claim 5 wherein m is 1.
9. A fractal polymer according to claim 8 wherein q is 0.
10. A fractal polymer according to claim 2 wherein —A— is —N(H) or —O—.
11. A fractal polymer according to claim 10 wherein —B— is —C(O)— or —N(H)C(O)—.
12. A fractal polymer according to claim 11 wherein —Z$_1$ is selected from the group consisting of —C(O)OH and —N=C=O.
13. A fractal polymer according to claim 12 wherein —Z$_1$ is —C(O)OH.
14. A fractal polymer according to claim 12 wherein —Z$_2$ is selected from the group consisting of —NH$_2$ and —OH.
15. A fractal polymer according to claim 13 wherein —Z$_2$ is —NH$_2$.

16. A fractal polymer according to claim 15 wherein

U is —O—, S(O)$_2$—, [[](—C(R$_5$)(R$_6$)—[]])$_p$, —N(R$_5$)— or —C(O)—;
$R_5$ is hydrogen; and
$R_6$ is hydrogen or methyl.

17. A fractal polymer according to claim 16 wherein —R$_1$—, —R$_2$— and —R$_3$— are the same or different and are polyvalent moieties of the formula:

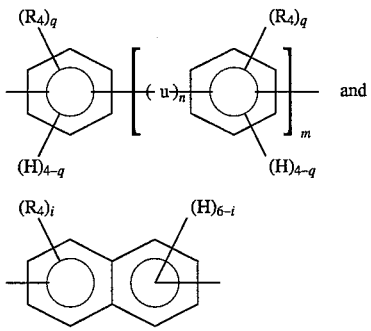

wherein;
$R_4$ is alkyl with at least one carbon.

18. A fractal polymer according to claim 17 wherein;

U is —O—, S(O)$_2$—, [[](—C(R$_5$)(R$_6$)—) []]$_p$, —N(R$_5$)— or —C(O)—; and
$R_5$ is hydrogen; and
$R_6$ is hydrogen or methyl.

19. A fractal polymer according to claim 18 wherein —R$_1$—, —R$_2$—, and —R$_3$— are the same or different and are polyvalent moieties of the formula:

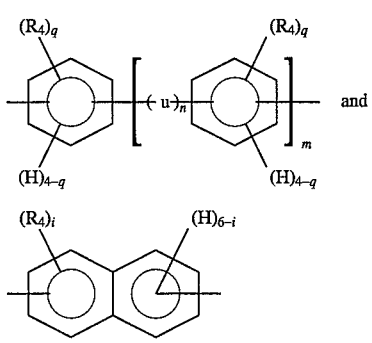

wherein:
$R_4$ is alkyl with at least one carbon;
n and m are the same or different and are 1 or 0;
U is —N(R$_5$)—; and
i and q are the same or different and are 0 or 1.

20. A fractal polymer according to claim 19 wherein m is 0.
21. A fractal polymer according to claim 20 wherein q is 0.
22. A fractal polymer according to claim 21 wherein m is 1.
23. A fractal polymer according to claim 22 wherein q is 0.
24. A fractal polymer according to claim 19 wherein —Z$_2$ is —NH$_2$.

25. A star copolymer comprising:
a) a porous, three-dimensional, branched fractal polymer core comprising:
i.) one to four aromatic nuclei of the formula:

$$-(A_1)_a-R_1-(B_1)_b-$$

ii.) a branched polymeric moiety bonded to and projecting away from said nuclei having branching recurring monomeric units of the formula:

$$-(B_2)_c-R_2-(A_2)_d-$$

which branching recurring monomeric units may be optionally linked by iii.) linear aromatic polymer segments comprised of one or more recurring extension monomeric units of the formula:

$$-B_3-R_3-A_3-$$

in a ratio of between about 0.25 to about 1 moles branching recurring units to between about 0 to 1 mole extension monomeric units, said aromatic polymer segments, a portion of said branching moieties, or a combination thereof having one or more terminating groups of the formula selected from the group consisting of $(B_2)_c-R_2-(Z_1)_d$, $-(A_2)_d-R_2-(Z_2)_c$, $-B_3-R_3-Z_1$, $-A_3R_3-Z_2$, and combinations thereof; and b.) an average of nine or less graft linear polymeric moieties selected from the group consisting of linear polyamide and linear polyester, which may be the same or different, covalently bonded to the exterior of said core by way of divalent exterior linking moieties of the formula:

$$-Z_1-$$

when c is greater than d, and of the formula:

$$-Z_2-$$

when d is greater than c, wherein:

—Z— is selected from the group consisting of —C(O)OH, —N=C=O, and —C(O)Cl and is the residue formed by reaction of an exterior —$Z_1$ group of said core and a —$Z_2$ group substituted to a linear polymer precursor of said linear polymeric moieties;

—$Z_2$— is selected from the group consisting of —$NH_2$ and —OH and is the residue formed by reaction of an exterior —$Z_2$ group of said core and a —$Z_1$ moiety substituted to a linear polymer precursor of said linear or substantially linear polymeric moieties;

a and b are different and are integers equal to 0, or equal to or greater than 3, with the proviso that a or b is 0;

$R_1$ is a polyvalent aromatic group selected from the group consisting of phenyl, biphenyl, and naphthyl, or is an aromatic moiety comprising two or more aromatic groups linked together by a linking moiety selected from the group consisting of ester, urethane and amide linkage;

$R_2$ and $R_3$ are the same or different at each occurrence and are a polyvalent aromatic group selected from the group consisting of phenyl, naphthyl, and biphenyl;

—$Z_2$ is the same or different at each occurrence and is a nucleophilic group which is capable of reaction with a —$Z_1$ group to form a covalent bond or a derivative thereof;

—$Z_1$ is the same or different at each occurrence and is electrophilic group which is capable of reaction with —$Z_2$ group to form a covalent bond or a derivative thereof;

$A_1$, $A_2$ and $A_3$ are the same or different at each occurrence the residue of a nucleophilic group formed by a reaction between a nucleophilic group $Z_2$ and an electrophilic group $Z_1$;

$B_1$, $B_2$ and $B_3$ are the same or different at each occurrence and is the residue of an electrophilic group formed by reaction between a nucleophilic group —$Z_2$ and an electrophilic group —$Z_1$; and c and d are different and are integers equal to or greater than 1, with the proviso that the sum of c and d is equal to or greater than 3, and with the further proviso that when a is equal to 0 then d is greater than c and that when b is equal to 0 then c is greater than d.

26. A molecular composite comprising a matrix which comprises one or more matrix polymers selected from the group consisting of crystalline polymers, amorphous polymers and combinations thereof having dispersed therein a star copolymer of claim 25.

27. The star copolymer of claim 25 wherein the graft linear polymeric moieties are selected from the group consisting of poly(caprolactam) and polyethyleneterephthalate.

* * * * *